United States Patent
Costa et al.

(10) Patent No.: US 10,159,086 B1
(45) Date of Patent: Dec. 18, 2018

(54) SELECTIVE ADVANCED OBTAINING AND REPORTING OF IDENTIFICATION OF DETECTED CELL TO FACILITATE EXPEDITED HANDOVER

(71) Applicant: Sprint Spectrum L.P., Overland Park, KS (US)

(72) Inventors: Julio Costa, Tampa, FL (US); Jack B. Sippel, II, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 50 days.

(21) Appl. No.: 15/497,064

(22) Filed: Apr. 25, 2017

(51) Int. Cl.
*H04W 72/12* (2009.01)
*H04W 72/10* (2009.01)
*H04W 72/04* (2009.01)
*H04W 88/02* (2009.01)
*H04W 48/14* (2009.01)
*H04W 76/00* (2018.01)
*H04W 36/00* (2009.01)
*H04W 76/14* (2018.01)
*H04W 24/08* (2009.01)
*H04W 36/36* (2009.01)
*H04W 56/00* (2009.01)
*H04W 4/08* (2009.01)
*H04W 36/30* (2009.01)

(52) U.S. Cl.
CPC ... *H04W 72/1215* (2013.01); *H04W 36/0022* (2013.01); *H04W 48/14* (2013.01); *H04W 72/048* (2013.01); *H04W 72/0413* (2013.01); *H04W 72/0453* (2013.01); *H04W 72/10* (2013.01); *H04W 72/1278* (2013.01); *H04W 76/00* (2013.01); *H04W 76/14* (2018.02); *H04W 88/02* (2013.01); *H04W 4/08* (2013.01); *H04W 24/08* (2013.01); *H04W 36/00* (2013.01); *H04W 36/0016* (2013.01); *H04W 36/0061* (2013.01); *H04W 36/30* (2013.01); *H04W 36/36* (2013.01); *H04W 56/001* (2013.01); *H04W 72/04* (2013.01)

(58) Field of Classification Search
CPC ..... H04W 36/30; H04W 36/08; H04W 36/18; H04W 64/00
See application file for complete search history.

(56) References Cited

U.S. PATENT DOCUMENTS 5,805,995 A * 9/1998 Jiang ..................... H04W 36/30
455/436

* cited by examiner

*Primary Examiner* — Chandrahas B Patel

(57) ABSTRACT

Disclosed are methods and systems for a UE to expedite handover through advanced obtaining and reporting of a network identifier. The UE could detect for possible handover a target cell that a target base station provides. In response to the detecting, the UE could determine that the target base station is of a particular class of base stations and, responsive to determining that the target base station is of the particular class, could determine and report the network identifier to a source base station serving the UE. In this way, if the source base station does not have a record of the network identifier, the source base station would not need to request the UE to determine and report that identifier, and could instead use the reported network identifier as basis to engage in handover signaling to process handover of the UE to the target cell, thereby expediting handover.

20 Claims, 6 Drawing Sheets

SELECTIVE ADVANCED OBTAINING AND REPORTING OF IDENTIFICATION OF DETECTED CELL TO FACILITATE EXPEDITED HANDOVER

BACKGROUND

A typical cellular wireless network includes a number of base stations each radiating to define a respective coverage area in which user equipment devices (UEs) such as cell phones, tablet computers, tracking devices, embedded wireless modules, and other wirelessly equipped communication devices (whether or not user operated), can operate. In particular, each coverage area could operate on one or more carriers each defining a respective frequency bandwidth of coverage. In turn, each base station could be coupled with network infrastructure that provides connectivity with one or more transport networks, such as the public switched telephone network (PSTN) and/or the Internet for instance. With this arrangement, a UE within coverage of the network could engage in air interface communication with a base station and could thereby communicate via the base station with various remote network entities or with other UEs served by the base station.

Generally, a base station in a wireless communication system can take various forms. For instance, the base station could be a macro base station that provides a broad range of coverage and could thus include a tall antenna tower and a power amplifier for providing high transmission power. Alternatively, the base station could be a small-cell base station ("small cell"), such as a femtocell and/or a relay base station, typically having a much smaller form factor and operating at lower transmission power for providing a smaller range of coverage.

Further, a cellular wireless network could operate in accordance with a particular air interface protocol (radio access technology), with communications from the base stations to UEs defining a downlink or forward link and communications from the UEs to the base stations defining an uplink or reverse link. Examples of existing air interface protocols include, without limitation, Long Term Evolution (LTE) (using Orthogonal Frequency Division Multiple Access (OFDMA) and Single Carrier Frequency Division Multiple Access (SC-FDMA)), Code Division Multiple Access (CDMA) (e.g., 1xRTT and 1xEV-DO), Global System for Mobile Communications (GSM), IEEE 802.11 (WIFI), BLUETOOTH, among others. Each protocol could define its own procedures for registration of UEs, initiation of communications, handover between coverage areas, and other functions related to air interface communication.

In accordance with various industry standards, a base station could provide multiple cells in various directions and/or on various carrier frequencies, and each such cell could have a respective coverage identifier. For example, in accordance with a recent version of the LTE standard, each base station could have a global base station ID and each cell of a base station could have a cell ID. Thus, at the system level, each combination of global base station ID and cell ID could define a network identifier for a cell (which could also be referred to as a globally unique identifier). In LTE, this network identifier is known as an Evolved Universal Terrestrial Radio Access Network (E-UTRAN) cell global identifier (ECGI). Moreover, in terms of air interface coverage, each cell provided by the base station also has a physical cell identifier (PCI) that is identifiable by a UE. While a network identifier is globally unique within a public land network, there are only 504 possible PCIs. Thus, PCIs are likely to be repeated many times throughout a public land mobile network.

In a system arranged as described above, PCI(s) and network identifier(s) could help facilitate handover processes. For example, when a source base station is serving a UE and the UE detects sufficiently strong coverage from a target cell of a target base station, the UE could send a measurement report to the source base station indicating signal strength (e.g., a received strength or signal-to noise ratio) for the target cell and specifying the target cell's PCI. The source base station could in turn determine if applicable handover thresholds are met. And if so, the source base station could then use a network identifier of the target cell as basis to engage in handover signaling with the target base station to orchestrate handover of the UE to the reported target cell.

More specifically, given that the target cell's network identifier is defined by the combination of the target base station's global base station ID and the target cell's cell ID, the source base station could use the global base station ID and the cell ID to facilitate handover of the UE to the reported target cell. For instance, the source base station could use the global base station ID of the target base station as basis for transmitting to the target base station, either over a direct inter-base-station interface or through one or more other network entities, a handover request message that requests the target base station to provide service to the UE through the target cell. And the handover request message could specify the target cell using the cell ID of the target cell. In this way, the target base station could then engage in a handover preparation process to establish a radio link for the UE in the target cell, and the UE could then ultimately transition to be served by the target cell.

Generally, the source base station could have access to the network identifier of the target cell through a neighbor list that the source base station (and/or other network entity) maintains. In particular, the neighbor list may list neighboring cells and, for each listed neighboring cell, may include a mapping of that cell's PCI to a network identifier of that cell. As such, if the source base station decides to trigger handover of the UE to a target cell of a target base station, the source base station could then refer to the neighbor list in order to determine the network identifier of the target cell based on the reported PCI of the target cell. And the source base station could then use the determined network identifier to facilitate handover of the UE to the target cell as discussed above.

OVERVIEW

In some situations, however, a target cell might not be listed in a source base station's neighbor list. And in that case, the source base station could use an alternative approach to determine a network identifier of the target cell, so as to facilitate handover of a UE to the target cell. In particular, after the UE detects the target cell and reports to the source base station the PCI of the detected target cell for possible handover, the source base station could determine that it does not have access to the target cell's network identifier through its neighbor list. In that case, the source base station could transmit to the UE a request for the UE to obtain and report, to the source base station, the network identifier of the target cell. In turn, responsive to receiving that request, the UE could then determine the network identifier of the target cell, such as by receiving the network identifier via a broadcast on the target cell for instance, and could then report the determined network identifier to the source base station. Once the source base station thus receives the determined network identifier from the UE in response to the request, the source base station could then use the determined network identifier to facilitate handover of the UE to the target cell as discussed above.

Although this alternative approach could help the source base station ultimately hand over the UE to the target cell, unfortunately, the approach could add delay to the handover process. In particular, after the source base station requests the UE to determine and report the network identifier, the source base station may then need to wait for the UE to do so before the source base station could proceed with the handover process. In practice, this wait could be time consuming and thus add delay to the handover process.

To help resolve this issue, the present disclosure provides for advanced obtaining and reporting of a network identifier. In accordance with the disclosure, when a UE detects a target cell for possible handover, the UE could responsively obtain and report a network identifier of the target cell without waiting to receive from a source base station a request to obtain and report that network identifier. In this way, the UE could enable the source base station to facilitate handover of the UE to the target cell even if the source base station does not have a record of the target cell's network identifier, thereby helping to avoid the above-mentioned delay in handover.

On the other hand, the present disclosure recognizes that such advanced obtaining and reporting of a network identifier could be redundant in situations where a source base station already has a record of the network identifier of the target cell. For this reason, the present disclosure additionally provides for more selective advanced obtaining and reporting of a network identifier.

In particular, the present disclosure recognizes that certain classes of base stations may be more likely than others to have their cells listed in neighbor lists, and thus a source base station may be more likely to have access to network identifiers of those cells than others. For example, as a wireless service provider engages in network densification by rolling out small-cell base stations, the cells provided by these small-cell base stations may not be listed in neighbor lists respectively maintained by other base stations of the wireless service provider. As a result, when a UE reports to the source base station a target cell provided by one of these newly rolled out small-cell base stations, there may be an increased likelihood that the source base station will not have a record of the target cell's network identifier.

Given this, a UE could be arranged to engage in the advanced obtaining and reporting of a network identifier of a target cell specifically in response to that target cell being provided by a base station that is of a particular class of base stations, such as of a class that is less likely to have its respectively provided cells listed in neighbor lists. In particular, when a UE detects a target cell for possible handover, the UE may responsively determine a class of a target base station that provides this target cell. If the UE determines that the target base station is of the particular class (e.g., a small-cell base station), the UE may responsively obtain a network identifier of the target cell from the target base station and may include that network identifier in a measurement report to the source base station, such as in addition to including a PCI of the target cell. On the other hand, if the UE determines that the target base station is of a class other than the particular class (e.g., a macro base station), the UE may responsively report the PCI of the target cell to the source base station but may forgo determining and reporting the network identifier of the target cell to the source base station unless and until the UE receives from the source base station a request to do so as discussed above.

Accordingly, in one respect, disclosed is a method. The method could be operable in a given UE that is being served by a source base station. In practice, when a UE reports to the source base station a cell detected by the UE for possible handover, the source base station responsively (a) uses a network identifier of the reported cell as a basis to engage in handover signaling to process handover of the UE, and (b) if the source base station does not have the network identifier of the reported cell, the source base station requests the UE to determine and report to the source base station the network identifier of the reported cell so as to enable the source base station to engage in the handover signaling.

In accordance with the method, while the given UE is being served by the source base station, the given UE could detect a target cell for possible handover, which could be a target cell that a target base station provides. And in response to detecting the target cell, the given UE could (a) make a determination of whether or not the target base station is of a particular class of base stations, and (b) transmit, to the source base station, a measurement report indicating the detected target cell. In line with the discussion above, if the determination is that the target base station is not of the particular class, then the given UE could forgo including in the measurement report a network identifier of the target cell. But if the determination is that the target base station is of the particular class, then the given UE could autonomously determine the network identifier of the target cell, as discussed above for instance, and include the determined network identifier of the target cell in the measurement report to the source base station.

In another respect, disclosed is another method. In accordance with the method, a UE could engage in communication with a source base station to cause the source base station to serve the UE over an air interface connection between the UE and the source base station. The UE could have a first mode of operation in which the UE reports both a PCI of a detected target cell and a network identifier of the detected target cell to a base station without waiting to receive from the base station a request to determine and report the network identifier of the target cell to the base station. And the UE could have a second mode of operation in which the UE reports the PCI of the detected target cell to the base station, but does not determine and report the network identifier of the target cell to the base station unless and until the UE receives the request from the base station.

Given this, while the UE is being served by the source base station over the air interface connection, the UE could detect a given target cell for possible handover, which could be a target cell that a target base station provides. And in response to detecting the given target cell and before reporting the detecting of the given target cell to the source base station, the UE could make a determination of whether the target base station is of a first class of base stations or rather of a second class of base stations. If the determination is that the target base station is of the first class, then, responsive to making the determination, the UE could operate in accordance with the first mode. Whereas, if the determination is that the target base station is of the second class, then, responsive to making the determination, the UE could operate in accordance with the second mode.

Further, in yet another respect, disclosed is a UE. The UE could include one or more processors, a data storage, and program instructions stored in the data storage and executable by the one or more processors to carry out operations. The operations could involve, while the UE is being served by a source base station over an air interface connection between the UE and the source base station, detecting a target cell for possible handover, which could be a target cell that a target base station provides. Also, the operations could involve, in response to detecting the target cell and before reporting the detected target cell to the source base station, determining that the target base station is of a particular class of base stations. Further, the operations could involve, in response to determining that the target base station is of the particular class and without waiting to receive from the source base station a request for a network identifier of the target cell, determining the network identifier of the target cell and reporting the determined network identifier to the source base station.

Still further, in yet another respect, disclosed is a non-transitory computer-readable medium having stored thereon instructions executable by a processor so as to help expedite handover through selective advanced obtaining and reporting of a network identifier.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

The present methods and system will be described herein in the context of LTE. However, it will be understood that principles of the disclosure can extend to apply in other scenarios as well, such as with respect to other air interface protocols. Further, even within the context of LTE, numerous variations from the details disclosed herein could be possible. For instance, elements, arrangements, and functions could be added, removed, combined, distributed, or otherwise modified. In addition, it will be understood that functions described here as being performed by one or more entities could be implemented in various ways, such as by a processor executing software instructions for instance.

Figure 1:
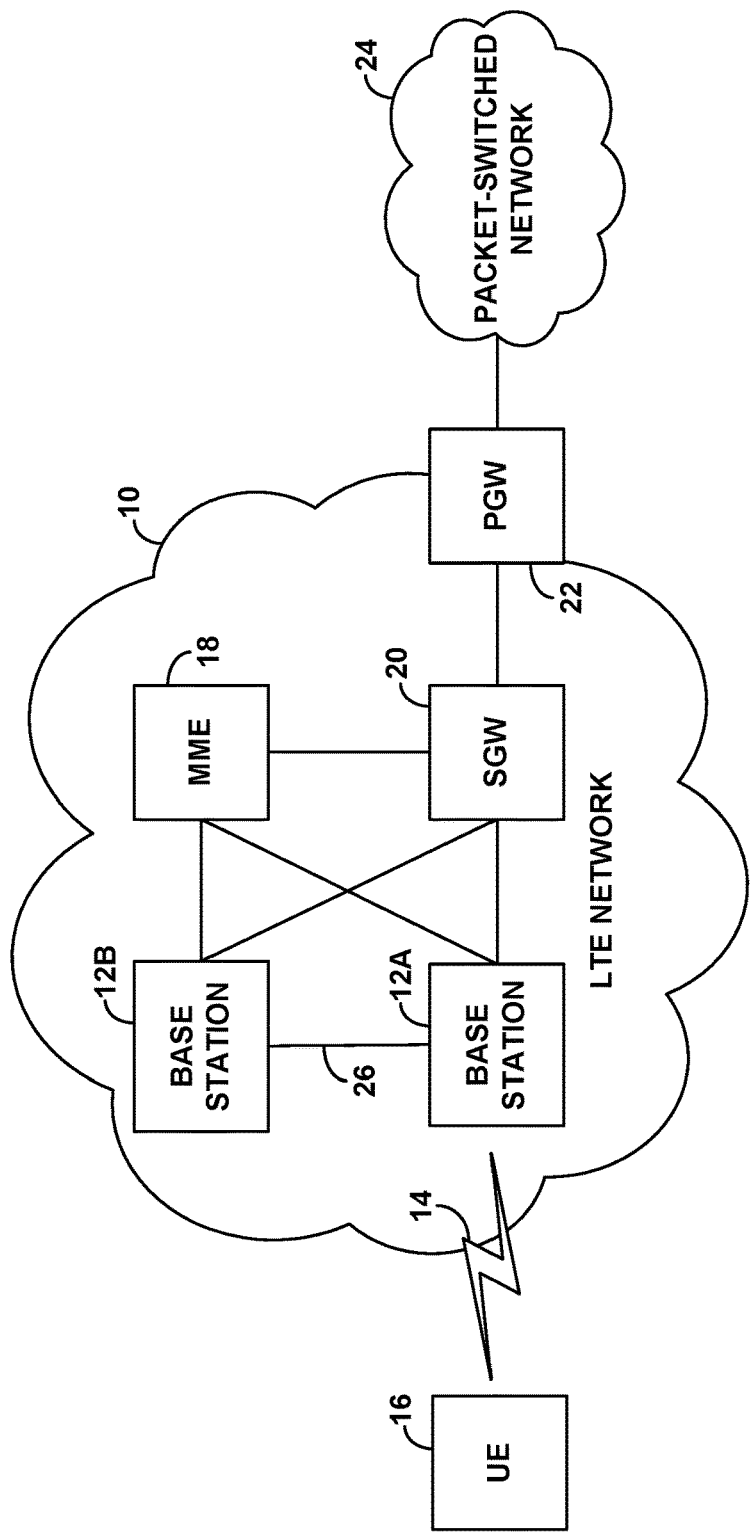
FIG. 1 is a simplified block diagram of a wireless communication system in which the present methods can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions.

As shown, LTE network 10 includes a base station 12A (e.g., an evolved Node B), which has an antenna structure and associated equipment for providing an LTE coverage area 14 in which to serve UEs such as UE 16. The base station 12A then has a communication interface with a mobility management entity (MME) 18 that functions as a signaling controller for the LTE network. Further, base station 12A has a communication interface with a serving gateway (SGW) 20, which in turn has a communication interface with a packet-data network gateway (PGW) 22 that provides connectivity with a packet-switched network 24 such as the Internet, and the MME 18 has a communication interface with the SGW 20.

Moreover, the illustrated communication system includes another base station 12B interconnected with network infrastructure, such as with the MME 18 and the SGW 20, providing connectivity with one or more networks (e.g., the packet-switched network 24). In practice, the base stations 12A and 12B may engage in signaling communication with each other. For example, the base stations 12A and 12B may communicate with each other over an X2 interface 26, which may physically pass through core network(s) or over a more direct physical connection between the base stations.

With this arrangement, when a UE enters into coverage of a base station, the UE may detect the base station's coverage on a particular cell, and the UE and the base station may then engage in an attach process or handover process to register the UE with the network on that cell. For instance, the base station and the UE may engage in radio resource control (RRC) signaling to establish on the cell an RRC connection defining a radio-link-layer connection between the UE and the base station. Further, the UE may transmit to the base station an attach request, which the base station may pass along to the network infrastructure (e.g., to the MME 18), triggering a process of authenticating the UE and establishing one or more bearer connections for the UE between the base station and the PGW 22, among other operations.

Furthermore, as described above, a base station may have various associated identifiers that entities (e.g., UEs) may use to identify the base station and/or its cell(s). For example, in accordance with LTE as noted above, each base station may have a global base station ID and each cell of a base station may have a cell ID. As noted, each combination of global base station ID and cell ID may be used at the system level to define a network identifier for a cell, such as an ECGI of the cell. In this way, each network identifier may be globally unique within a public land network at the system level. Further, in terms of air interface coverage, each cell provided by a base station also has a PCI that is identifiable by a UE. And in accordance with LTE, there are only 504 possible PCIs. Thus, in contrast with network identifiers, PCIs may be repeated many times throughout a public land mobile network.

Generally, a UE could determine a given cell's PCI in various ways. Under LTE, for example, a base station may transmit a primary synchronization signal (PSS) and a secondary synchronization signal (SSS) on each cell (e.g., within a certain range of resource elements on the six center resource blocks of a carrier). The PSS carries a coded value, and the SSS carries a coded value. With this arrangement, the UE may search for the PSS of a cell (e.g., by looking for a PSS value that periodically recurs as expected) so as to lock onto sub-frame timing of the cell. The UE may then read the SSS of the cell (e.g., by looking at resource elements located one symbol period before identified resource elements of the PSS) to lock onto frame timing of the cell. Once the UE ascertains the PSS value and SSS value, the UE can then compute a PCI value of the cell (e.g., as a predefined function of those values).

Given that a UE could determine PCI(s) of cell(s), the UE could use such PCI(s) in various ways. For example, when a UE tunes away from its serving base station to scan for and monitor pilot or reference signals from various neighboring cells, the UE may determine a signal level and the identities of those cells. The UE may then transmit to its serving base station a measurement report that specifies the signal level of each cell detected by the UE. In particular, the measurement report may specify each detected cell (e.g., by PCI) and the signal level (e.g., by Reference Signal Received Power (RSRP), or signal-to-noise ratio) of the cell as determined by the UE. In practice, a given measurement report may thus include such information for the UE's currently serving cell and may also include such information for each of one or more neighboring cells detected by the UE. In this regard, the UE could report neighbor cell(s) in this way only responsive to detecting a threshold low signal level on its serving cell.

Moreover, when the serving base station receives such a measurement report from the UE, if the measurement report specifies a signal level of a neighboring cell, the base station or other network entity may engage in a process to decide whether to trigger handover of the UE to the neighboring cell. In general, this process may involve evaluating the reported signal level of the serving cell to determine whether it is sufficiently weak, evaluating the reported signal level of the neighboring cell to determine whether it is sufficiently strong itself, and/or evaluating whether the reported signal level of the neighboring cell is sufficiently stronger than the reported signal level of the serving cell.

If the serving base station (e.g., base station 12A) decides to trigger handover of the UE to a target cell of a target neighboring base station (e.g., base station 12B), the serving base station may then refer to a neighbor list of neighboring cells, so as to facilitate the handover. In particular, as noted above, for each listed neighboring cell, the neighbor list may include a mapping of that cell's PCI to a network identifier of that cell, such as to an ECGI of the cell for instance. As such, the serving base station could refer to the neighbor list in order to determine the network identifier of the target cell based on the reported PCI of the target cell. The serving base station could then use the determined network identifier to determine the global base station ID of the target base station and/or the cell ID of the target cell, which the serving base station could use to help facilitate handover of the UE to the target cell.

More specifically, the serving base station may use that global base station ID as basis to transmit to the target base station, either over a direct inter-base-station interface (e.g. X2 interface 26), or through one or more other network entities, a handover request message that requests the target base station to provide service to the UE through the target cell. For example, the serving base station could query an MME (e.g., MME 18) to map the global base station ID to an IP address of the target base station, which may enable the serving base station to engage in signaling with the target base station. Moreover, the handover request message may specify the target cell using the cell ID of the target cell. In this way, once the target base station receives the handover request, the target base station may then engage in a handover preparation process to establish a radio link for the UE in the target cell, and the UE may then ultimately transition to be served by the target cell.

In line with the discussion above, if the serving base station determines that the target cell is not listed in the neighbor list and thus that the neighbor list does not specify the target cell's network identifier, then the serving base station may request the UE to obtain and report to the serving base station the network identifier of the target cell. In practice, the UE could obtain the network identifier in various ways. By way of example, in an LTE system, a base station could periodically broadcast its ECGI as part of a system information block (SIB) over a channel. Given this, the UE could scan for and monitor that channel to obtain the ECGI from a target base station and could then report this information to its serving base station. Other examples are also possible.

By requesting the UE to obtain and report the network identifier of the target cell, the serving base station could determine the network identifier when it is not listed in the neighbor list, thereby allowing the serving base station to communicate with the target base station and thus to hand over the UE to the target cell. Specifically, when the serving base station receives the requested network identifier from the UE, the serving base station could then query an MME (e.g., MME 18) to map that network identifier (or more specifically the global base station ID specified as part of the network identifier) to an IP address of the target base station, which, as noted above, may enable the serving base station to engage in signaling with the target base station. The serving base station may then send a handover request to the target base station, the target base station may establish a radio link for the UE, and the UE may transition to be served by the target cell.

Although the serving base station could determine the network identifier of a target cell by requesting a UE to obtain and report that network identifier, the process of the serving base station requesting to receive the network identifier and then waiting to receive that network identifier could be time consuming. And because this process could be time consuming, the process could add delay in handover of the UE to the target cell.

As noted above, the present disclosure could help avoid or minimize such added delay through selective advanced obtaining and reporting of a detected target cell's network identifier.

In accordance with the present disclosure, when a UE detects a target base station's target cell for possible handover, the UE could determine whether or not to obtain and then include that target cell's network identifier in a measurement report to its serving base station (could be referred to as a source base station), and could do so based on a determination by the UE of whether or not the target base station is of a particular class of base stations. In line with discussion above, this particular class may include base stations that are less likely than others to have their respectively provided cells listed in neighbor lists (e.g., small-cell base stations).

In particular, if the determination is that the target base station is of the particular class, then the UE may autonomously determine the network identifier of the target cell and include the determined network identifier of the target cell in the measurement report to the source base station. When the source base station receives the measurement report, the source base station could then use the included network identifier as a basis to engage in handover signaling to process handover of the UE to the target cell. Moreover, by including the network identifier, the UE may enable the source base station to forgo requesting the UE to obtain and report the network identifier when the source base station does not have access to that network identifier through its neighbor list.

On the other hand, if the determination is that the target base station is not of the particular class, then the UE may not include in the measurement report a network identifier of the target cell. In this case, given that the target base station is not of the particular class, the target base station may be of a class of base stations that are more likely than others to have their respectively provided cell(s) listed in a neighbor list (e.g., macro base stations). As such, when the source base station receives the measurement report from the UE, the source base station may responsively refer to a neighbor list to determine the target cell's network identifier. If the target cell is listed in the neighbor list and thus the neighbor list specifies the network identifier of the target cell, then the source base station may use the specified network identifier as basis to engage in handover signaling to process handover of the UE to the target cell. Otherwise, the source base station may send to the UE a request to obtain and then report the network identifier to the source base station as discussed above.

To facilitate the disclosed approach, the UE could be programmed to operate selectively in either of first and second modes of operation.

In the first mode, the UE may report both a PCI of a detected target cell and a network identifier of the detected target cell to a base station, and do so without waiting to receive from that base station a request to determine and report the network identifier of the target cell to the base station. And in the second mode, the UE may report the PCI of the detected target cell to the base station, but may not determine and report the network identifier of the target cell to the base station unless and until the UE receives from the base station the request to determine and report the network identifier of the target cell.

With this arrangement, when the UE detects a target cell that a target base station provides, the UE may select a mode of operation based on a class of the target base station. In particular, if the UE determines that the target base station is of a first class of base stations that are less likely than others to have their respectively provided cells listed in neighbor lists (e.g., small-cell base stations), then the UE may responsively operate in accordance with the first mode. But if the UE determines that the target base station is of a second class of base stations that are more likely than others to have their respectively provided cells listed in neighbor lists (e.g., macro base stations), then the UE may responsively operate in accordance with the second mode.

In practice, the UE could determine the class of a target base station using various techniques. Although certain such techniques are disclosed herein, it should be understood that other techniques are possible as well without departing from the scope of the present disclosure.

In one example implementation, the UE may receive from a target base station an indication that the target base station is of a particular class, and thus may determine the class of the target base station based on that received indication. For example, each of a wireless service provider's base stations could be provisioned with an indication of its class. Additionally, each such base station could be programmed to broadcast the indication of its class. For instance, a base station could broadcast that indication as part of a system information block (SIB), among other options. As such, a UE could determine a base station's class based on such a broadcast.

In another example implementation, the UE may determine a PSS value and/or SSS value of a target cell that a target base station provides, and may determine a class of the target base station based on the PSS value and/or the SSS value. For example, base stations of a first class of base stations, such as small-cell base stations, could be arranged such that their cells' respective SSS value(s) are of a first group of SSS values. And base stations of a second class of base stations, such as macro base stations, could be arranged such that their cells' respective SSS value(s) are of a second group of SSS values, the second group including SSS value(s) different than those in the first group. Additionally, the UE could have access to information indicating the first and second groups, and also indicating that the first group corresponds to the first class and that the second group corresponds to the second class. With this arrangement, the UE could refer to that information to determine whether an SSS value of the target cell is of the first group or of the second group. If the UE determines that the target cell's SSS value is of the first group, then the UE may determine based on the information that the target base station is of the first class. And if the UE determines that the target cell's SSS value is of the second group, then the UE may determine based on the information that the target base station is of the second class. In practice, this example could apply in the context of a PSS value as well. Other examples are possible as well.

In yet another example implementation, the UE may determine a PCI of a target cell that a target base station provides, and may determine a class of the target base station based on the PCI. For example, base stations of a first class of base stations, such as small-cell base stations, could be arranged such that their cells' respective PCIs are of a first group of PCIs. And base stations of a second class of base stations, such as macro base stations, could be arranged such that their cells' respective PCIs are of a second group of PCIs, the second group including PCIs different than those in the first group. Additionally, the UE could have access to information indicating the first and second groups, and also indicating that the first group corresponds to the first class and that the second group corresponds to the second class. With this arrangement, the UE could refer to that information to determine whether a PCI of the target cell is of the first group or of the second group. If the UE determines that the target cell's PCI is of the first group, then the UE may determine based on the information that the target base station is of the first class. And if the UE determines that the target cell's PCI is of the second group, then the UE may determine based on the information that the target base station is of the second class. Other examples are possible as well.

In a further aspect, the UE may carry out the disclosed approach in specific scenario(s), such as scenario(s) where reducing delays in handover may be particularly advantageous. An example of such a scenario could be the UE being engaged in a certain type of communication designated in some manner as being of higher importance. These certain types of communication may be those having higher designated priority levels (e.g., higher than a threshold priority level) and/or those designated as latency-sensitive, interruption-sensitive, or the like. As such, if the UE detects a target cell that a target base station provides, and determines both (i) that it is engaged in a type of communication designated as being of higher importance and (ii) that the target base station is of a particular class in-line with the discussion above, then the UE may responsively determine the network identifier of the target cell and include the determined network identifier of the target cell in a measurement report to its serving source base station.

In this regard, the UE may itself determine the type of communication in which the UE is engaged and/or may receive from the source base station (e.g., upon request) an indication of the type of communication in which the UE is engaged. Furthermore, the UE may itself determine it is engaged in a type of communication designated as being of higher importance and/or may receive from the source base station (e.g., upon request) an indication that the type of communication in which the UE is engaged is of higher importance.

In either case, an entity (e.g., the UE and/or the source base station) may determine the type of communication in various ways. By way of example, a data packet may have a respective payload segment carrying some or all of the data of the communication and may also have a header. In some cases, the data carried in the payload segment of such packets may be a digitally encoded representation of the particular type of communication to be transmitted. Such communication may itself be media content of some type, such as voice content, web content, gaming content, video content, e-mail content, or the like. Additionally or alternatively, an indicator (e.g., a differentiated services code point (DSCP)) may appear in a data packet's header, and that indicator may be representative of the type of communication carried by that packet. With this arrangement, an entity may use various techniques (e.g., deep packet inspection (DPI)) to read the payload and/or header of one or more such packets to programmatically determine one or more types of communication being carried by such packet(s).

Moreover, the entity may determine in various ways whether or not a certain type of communication is designated as being of higher importance. By way of example, the entity may have access to mapping data that maps each of various types of communications respectively to one or more designations, such as of that type of communication being latency-sensitive, interruption-sensitive, and/or of a threshold high priority level, or none of these options. As such, the entity could refer to this mapping data to determine whether or not a type of communication is designated as latency-sensitive, as interruption-sensitive, and/or as being of a threshold high priority level. Other examples are possible as well.

Figure 2:
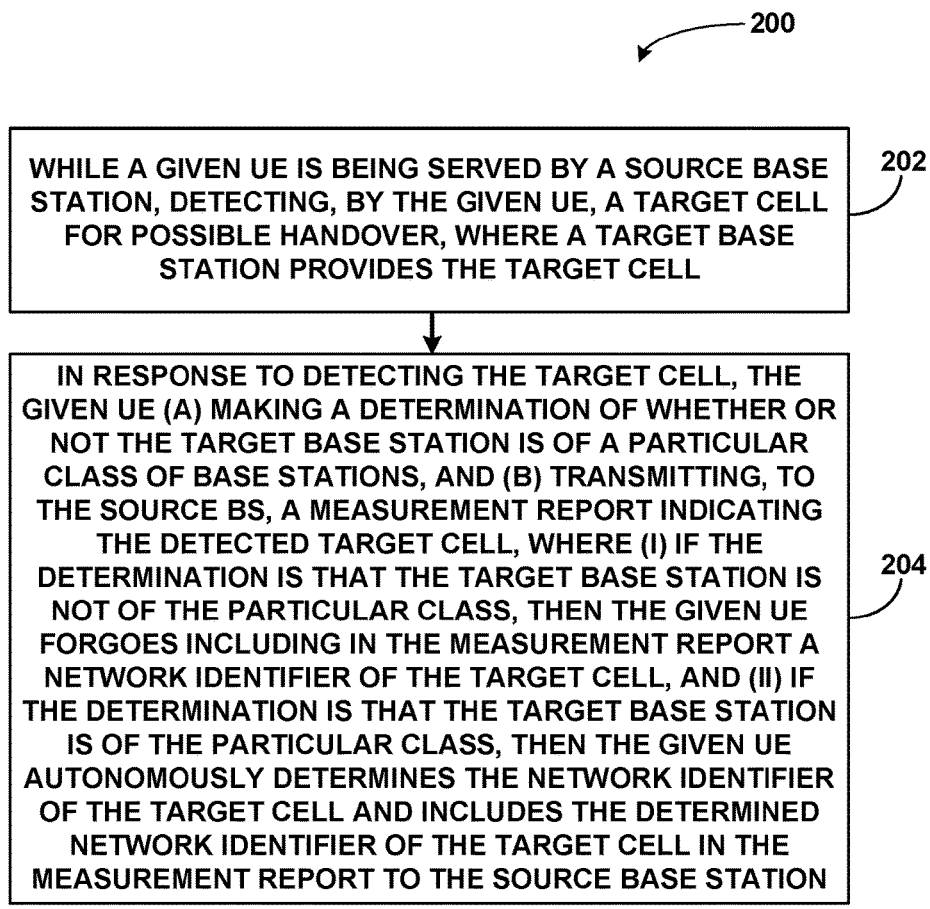
FIG. 2 is a flowchart illustrating a method to help expedite handover through selective advanced obtaining and reporting of a network identifier, in accordance with an example embodiment.

FIG. 2 is next a flowchart illustrating a method 200 according to an example embodiment. Illustrative methods, such as method 200, could be carried out in whole or in part by component(s) and/or arrangement(s) in a UE, such as with one or more of the components of the example UE shown in FIG. 5 and further discussed below, among other possibilities. However, it should be understood that example methods, such as method 200, could be carried out by other entities or combinations of entities as well as in other arrangements, without departing from the scope of the disclosure.

In particular, method 200 is operable in a given UE that is being served by a source base station. In practice, when a UE reports to the source base station a cell detected by the UE for possible handover, the source base station responsively (a) uses a network identifier of the reported cell as a basis to engage in handover signaling to process handover of the UE, and (b) if the source base station does not have the network identifier of the reported cell, the source base station requests the UE to determine and report to the source base station the network identifier of the reported cell so as to enable the source base station to engage in the handover signaling.

As shown by block 202 in FIG. 2, method 200 involves, while the given UE is being served by the source base station, detecting, by the given UE, a target cell for possible handover. Generally, a target base station provides the target cell. Further, at block 204, method 200 then involves, in response to detecting the target cell, the given UE (a) making a determination of whether or not the target base station is of a particular class of base stations, and (b) transmitting, to the source base station, a measurement report indicating the detected target cell. In accordance with the disclosure, if the determination is that the target base station is not of the particular class, then the given UE forgoes including in the measurement report a network identifier of the target cell. And if the determination is that the target base station is of the particular class, then the given UE autonomously determines the network identifier of the target cell and includes the determined network identifier of the target cell in the measurement report to the source base station.

Figure 3:
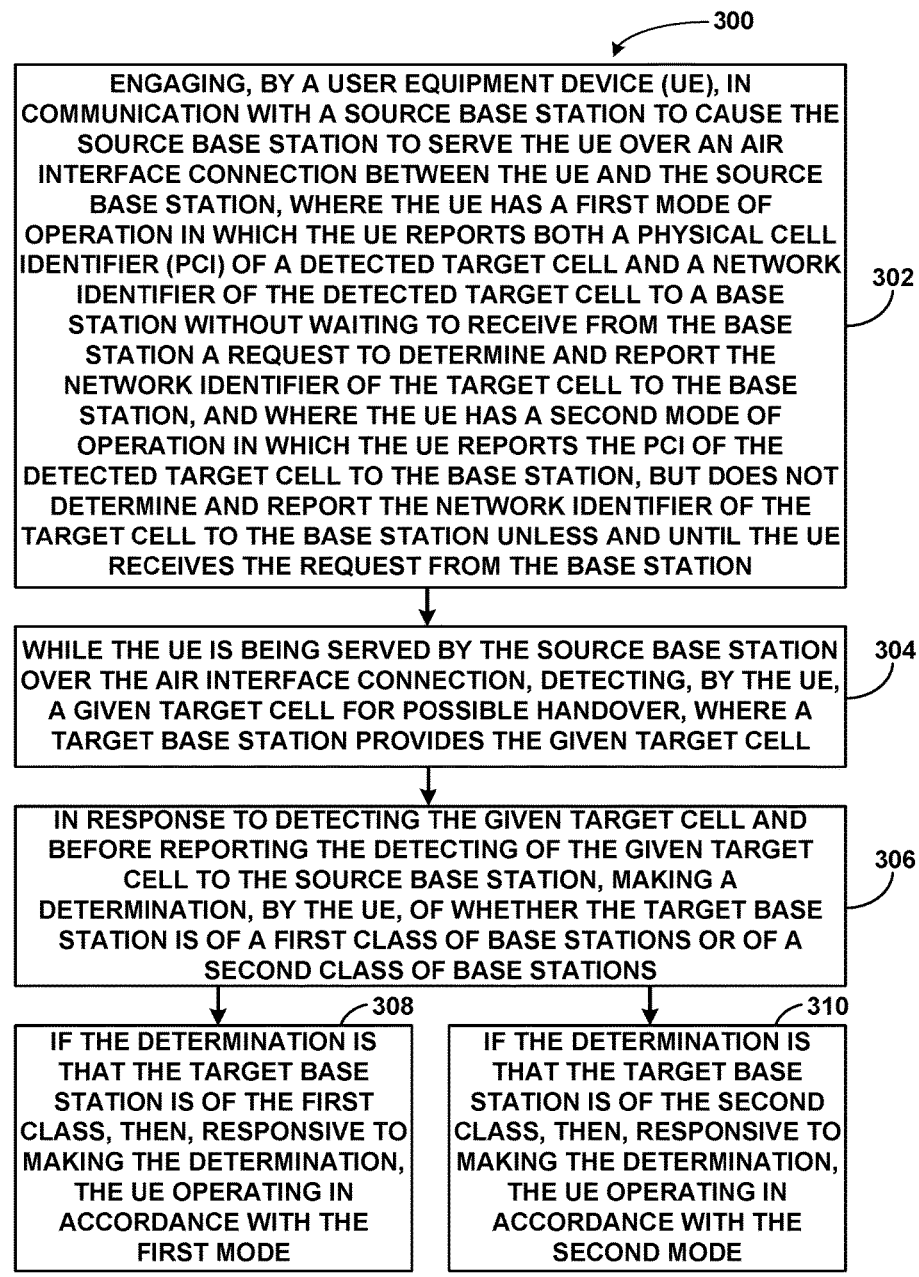
FIG. 3 is a flowchart illustrating another method to help expedite handover through selective advanced obtaining and reporting of a network identifier, in accordance with an example embodiment.

FIG. 3 is next a flowchart illustrating another method 300 according to an example embodiment. As shown by block 302 in FIG. 3, method 300 involves engaging, by a UE, in communication with a source base station to cause the source base station to serve the UE over an air interface connection between the UE and the source base station. The UE has (i) a first mode of operation in which the UE reports both a PCI of a detected target cell and a network identifier of the detected target cell to a base station without waiting to receive from the base station a request to determine and report the network identifier of the target cell to the base station, and (ii) a second mode of operation in which the UE reports the PCI of the detected target cell to the base station, but does not determine and report the network identifier of the target cell to the base station unless and until the UE receives the request from the base station.

At block 304, method 300 then involves, while the UE is being served by the source base station over the air interface connection, detecting, by the UE, a given target cell for possible handover. Here again, a target base station provides the target cell. And at block 306, method 300 involves, in response to detecting the given target cell and before reporting the detecting of the given target cell to the source base station, making a determination, by the UE, of whether the target base station is of a first class of base stations or of a second class of base stations. Then, at block 308, method 300 involves, if the determination is that the target base station is of the first class, then, responsive to making the determination, the UE operating in accordance with the first mode. On the other hand, at block 310, method 300 involves, if the determination is that the target base station is of the second class, then, responsive to making the determination, the UE operating in accordance with the second mode.

Figure 4:
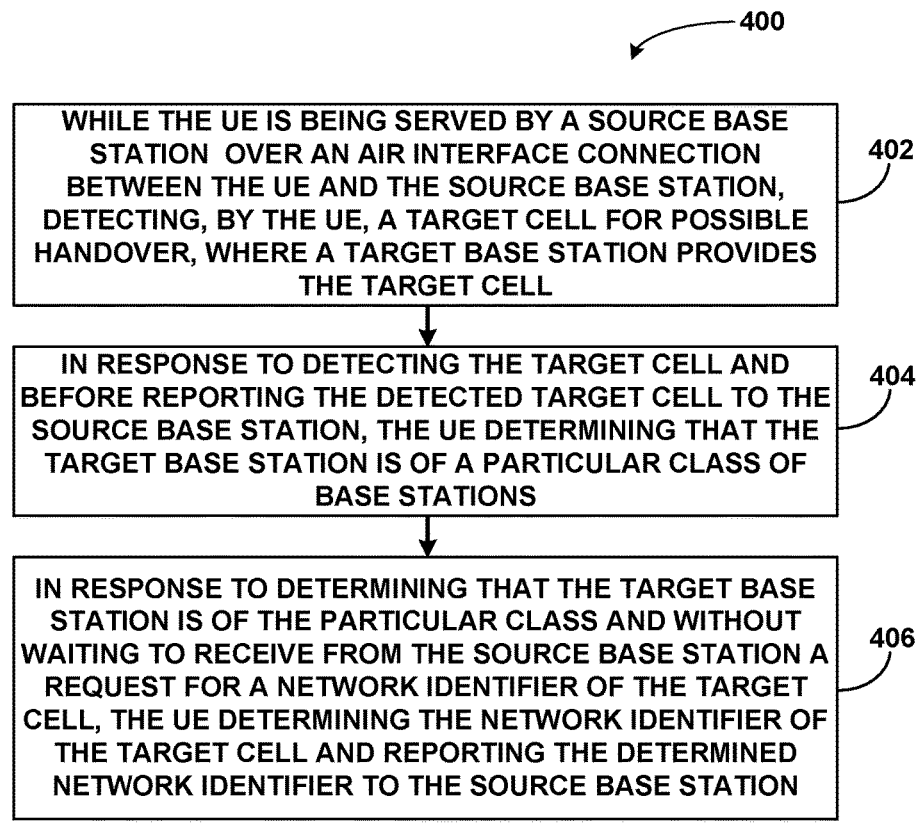
FIG. 4 is a flowchart illustrating yet another method to help expedite handover through selective advanced obtaining and reporting of a network identifier, in accordance with an example embodiment.

FIG. 4 is next a flowchart illustrating a method 400 according to an example embodiment. As shown by block 402 in FIG. 4, method 400 involves, while a UE is being served by a source base station over an air interface connection between the UE and the source base station, detecting, by the UE, a target cell for possible handover. Here again, a target base station provides the target cell. At block 404, method 400 then involves, in response to detecting the target cell and before reporting the detected target cell to the source base station, the UE determining that the target base station is of a particular class of base stations. And at block 406, method 400 then involves, in response to determining that the target base station is of the particular class and without waiting to receive from the source base station a request for a network identifier of the target cell, the UE determining the network identifier of the target cell and reporting the determined network identifier to the source base station.

Figure 5:
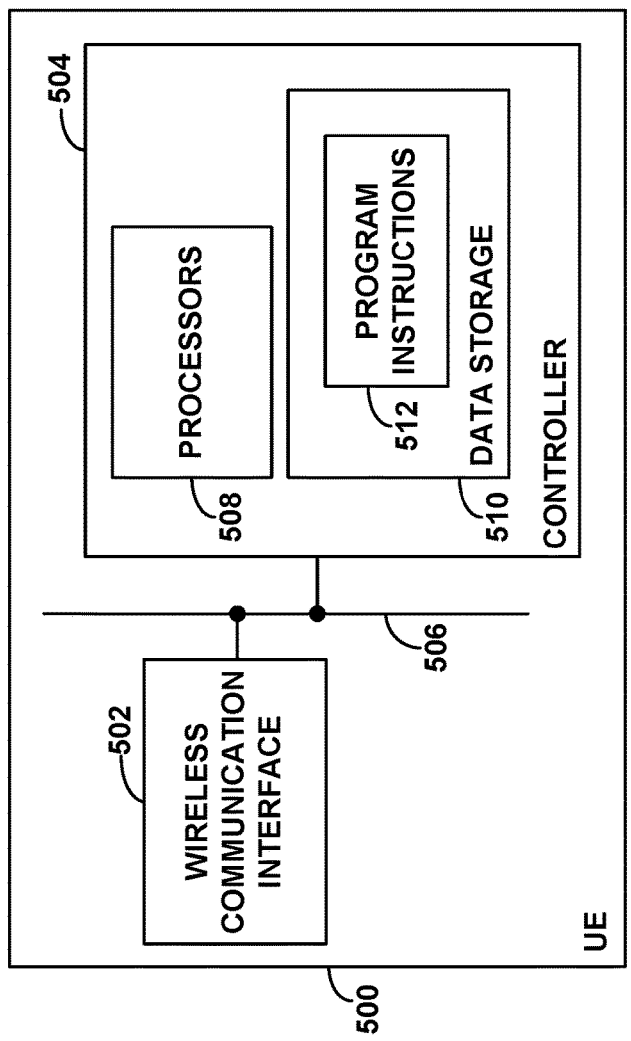
FIG. 5 is a simplified block diagram of a UE operable in accordance with the present disclosure.

FIG. 5 is next a simplified block diagram of an example UE, showing some of the components that can be included in such a UE. As shown in FIG. 5, the example UE includes a wireless communication interface 502 and a controller 504, all of which could reside within or on a housing and be integrated or communicatively linked together by a system bus, network, or other connection mechanism 506.

Wireless communication interface 502 is configured to allow the example UE to engage in wireless communication over the air interface with a base station. In particular, the wireless communication interface 502 could include or be interconnected with one or more antenna structures each arranged to facilitate air interface communications. Also, the interface 502 could include a processing unit programmed with program instructions to facilitate communication in accordance with one or more communication protocols for instance.

Controller 504, which could effectively be part of the wireless communication interface 502 or could be provided separately, could then or therefore be configured to cause the example UE to carry out various UE operations, such as operation disclosed herein to expedite handover through selective advanced obtaining and reporting of a network identifier. As such, the controller 504 could take various forms. For instance, the controller 504 could be hard coded or provided as hardware such as an application specific integrated circuit or other structure (not shown). Alternatively or additionally (as shown), the controller 504 could be provided as one or more processors 508 (e.g. one or more microprocessors), data storage 510, and program instructions 512 stored in the data storage 510 and executable by the one or more processors 508 to carry out the various operations.

In particular, the one or more processors 508 could comprise one or more general purpose processors (e.g., microprocessors) and/or special-purpose processors (e.g., digital signal processors and/or application specific integrated circuits) and could be integrated in whole or in part with the wireless communication interface 502. And data storage 510 could include one or more volatile and/or non-volatile storage components, such as magnetic, optical, flash, or other types of non-transitory computer readable media, and could be integrated in whole or in part with the one or more processors 508. As shown, data storage 510 could hold (e.g., have encoded thereon) program instructions 512, which could be executable by one or more processors 508 to carry out various controller functions.

Figure 6:
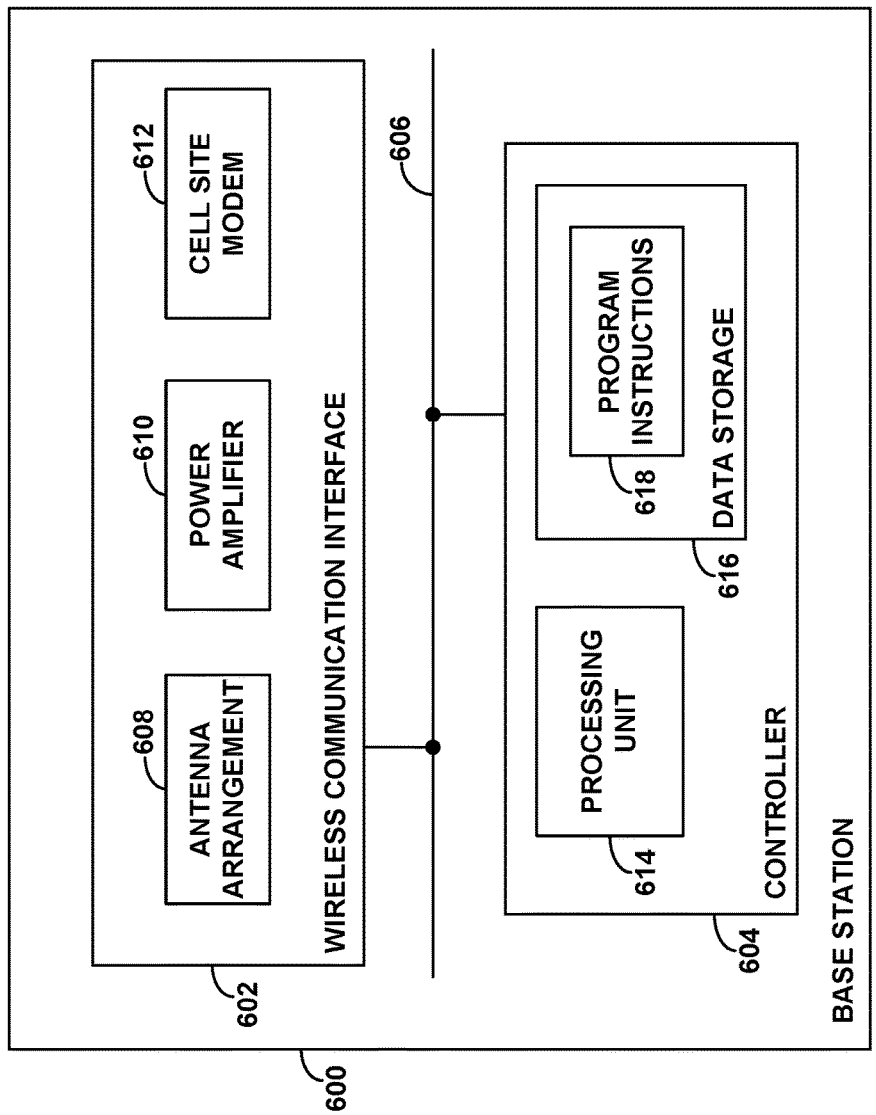
FIG. 6 is a simplified block diagram of a base station.

Finally, FIG. 6 is a simplified block diagram of a representative base station 600 such as base station 12A and/or 12B, illustrating some of the components that can be included in such an entity. As shown in FIG. 6, the representative base station 600 could include a wireless communication interface 602 and a controller 604. Additionally, these components of the base station 600 could be communicatively linked together by a system bus, network, or other connection mechanism 606. Alternatively, they could be integrated together in various ways.

As shown, interface 602 could include an antenna arrangement 608, which could be tower mounted, and associated components such as a power amplifier 610 and a cell site modem 612 for engaging in air interface communication with UEs via the antenna arrangement 608, so as to transmit data and control information to UEs and receive data and control information from UEs. Additionally, controller 604 could include processing unit 614 and data storage 616 and is arranged to manage or carry out various functions such as those discussed herein.

Processing unit 614 could then comprise general purpose processor(s) (e.g., microprocessors) and/or special-purpose processor(s) (e.g., digital signal processors and/or application specific integrated circuits) and could be integrated in whole or in part with the interface 602. And data storage 616 could include one or more volatile and/or non-volatile storage components, such as magnetic, optical, flash, or other types of non-transitory computer readable media, and could be integrated in whole or in part with processing unit 614.

As shown, data storage 616 could hold (e.g., have encoded thereon) program instructions 618, which could be executable by processing unit 614 to carry out various controller functions, such as by carrying out one or more of the operations described herein. As such, the processing unit 614 programmed with instructions 618 could define part or all of a controller for controlling operation of the base station 600. Alternatively or additionally, however, such control functionality could be provided external to the base station 600, in another entity (e.g., separate from the base station 600) such as by a base station control entity (e.g., Mobility Management Entity (MME)), which could be communicatively linked with the base station 600 and could serve to control certain aspects of base station operation generally.

Exemplary embodiments have been described above. It should be understood, however, that variations from these embodiments are possible, while remaining within the true spirit and scope of the invention.

We claim:

1. A method operable in a given user equipment device (UE) that is being served by a source base station, wherein, when a UE reports to the source base station a cell detected by the UE for possible handover, the source base station responsively (a) uses a network identifier of the reported cell as a basis to engage in handover signaling to process handover of the UE, and (b) if the source base station does not have the network identifier of the reported cell, the source base station requests the UE to determine and report to the source base station the network identifier of the reported cell so as to enable the source base station to engage in the handover signaling, the method comprising:

while the given UE is being served by the source base station, detecting, by the given UE, a target cell for possible handover, wherein a target base station provides the target cell; and in response to detecting the target cell, the given UE (a) making a determination of whether or not the target base station is of a particular class of base stations, and (b) transmitting, to the source base station, a measurement report indicating the detected target cell, wherein (i) if the determination is that the target base station is not of the particular class, then the given UE forgoes including in the measurement report a network identifier of the target cell, and (ii) if the determination is that the target base station is of the particular class, then the given UE autonomously determines the network identifier of the target cell and includes the determined network identifier of the target cell in the measurement report to the source base station.

2. The method of claim 1, wherein the network identifier is an Evolved Universal Terrestrial Radio Access Network (E-UTRAN) cell global identifier (ECGI).

3. The method of claim 1,
wherein transmitting, to the source base station, the measurement report including the determined network identifier of the target cell enables the source base station to determine the network identifier of the target cell without the target cell being listed in a neighbor list of neighboring cells, the neighbor list being maintained by the source base station and specifying for each listed neighboring cell a respective network identifier of the neighboring cell.

4. The method of claim 1, wherein making a determination of whether or not the target base station is of a particular class of base stations comprises making a determination of whether or not the target base station is a small-cell base station.

5. The method of claim 1, further comprising:
receiving, by the given UE from the target base station, an indication that the target base station is of the particular class,
wherein making the determination comprises making the determination based on the received indication.

6. The method of claim 1, further comprising:
determining, by the given UE, one or more of a physical cell identifier (PCI) of the target cell and a secondary synchronization signal (SSS) value of the target cell,
wherein making the determination comprises making the determination based on one or more of the determined PCI of the target cell and the determined SSS value of the target cell.

7. The method of claim 1, further comprising:
determining, by the given UE, that the given UE is engaged in a latency-sensitive communication,
wherein autonomously determining the network identifier of the target cell and including the determined network identifier of the target cell in the measurement report to the source base station is further responsive to determining that the given UE is engaged in the latency-sensitive communication.

8. The method of claim 1, further comprising:
in response to detecting the target cell, the given UE including a physical cell identifier (PCI) of the target cell in the measurement report to the source base station,
wherein, if the given UE includes the determined network identifier of the target cell in the measurement report, the given UE includes the determined network identifier of the target cell in the measurement report in addition to including the PCI of the target cell in the measurement report.

9. A method comprising:
engaging, by a user equipment device (UE), in communication with a source base station to cause the source base station to serve the UE over an air interface connection between the UE and the source base station, wherein the UE has a first mode of operation in which the UE reports both a physical cell identifier (PCI) of a detected target cell and a network identifier of the detected target cell to a base station without waiting to receive from the base station a request to determine and report the network identifier of the target cell to the base station, and wherein the UE has a second mode of operation in which the UE reports the PCI of the detected target cell to the base station, but does not determine and report the network identifier of the target cell to the base station unless and until the UE receives the request from the base station;
while the UE is being served by the source base station over the air interface connection, detecting, by the UE, a given target cell for possible handover, wherein a target base station provides the given target cell;
in response to detecting the given target cell and before reporting the detecting of the given target cell to the source base station, making a determination, by the UE, of whether the target base station is of a first class of base stations or of a second class of base stations;
if the determination is that the target base station is of the first class, then, responsive to making the determination, the UE operating in accordance with the first mode; and
if the determination is that the target base station is of the second class, then, responsive to making the determination, the UE operating in accordance with the second mode.

10. The method of claim 9, wherein the network identifier is an Evolved Universal Terrestrial Radio Access Network (E-UTRAN) cell global identifier (ECGI).

11. The method of claim 9,
wherein the UE operating in accordance with the first mode enables the base station to determine the network identifier of the detected target cell without transmitting to the UE the request to determine and report the network identifier of the target cell to the base station.

12. The method of claim 9, wherein making the determination of whether the target base station is of a first class of base stations or of a second class of base stations comprises:
making a determination of whether the target base station is a small-cell base station or whether the target base station is a macro base station.

13. The method of claim 9, further comprising:
receiving, by the UE from the target base station, an indication of whether the target base station is of the first class or of the second class,
wherein making the determination comprises making the determination based on the received indication.

14. The method of claim 9, further comprising:
determining, by the UE, one or more of a physical cell identifier (PCI) of the given target cell and a secondary synchronization signal (SSS) value of the given target cell,
wherein making the determination comprises making the determination based on one or more of the determined PCI of the given target cell and the determined SSS value of the given target cell.

15. A user equipment device (UE) comprising:
one or more processors;
a data storage; and
program instructions stored in the data storage and executable by the one or more processors to carry out operations comprising:
while the UE is being served by a source base station over an air interface connection between the UE and the source base station, detecting a target cell for possible handover, wherein a target base station provides the target cell;
in response to detecting the target cell and before reporting the detected target cell to the source base station, determining that the target base station is of a particular class of base stations; and
in response to determining that the target base station is of the particular class and without waiting to receive from the source base station a request for a network identifier of the target cell, determining the network identifier of the target cell and reporting the determined network identifier to the source base station.

16. The UE of claim 15, wherein the network identifier is an Evolved Universal Terrestrial Radio Access Network (E-UTRAN) cell global identifier (ECGI).

17. The UE of claim 15, wherein determining that the target base station is of a particular class comprises determining that the target base station is a small-cell base station.

18. The UE of claim 15, the operations further comprising:
receiving, from the target base station, an indication of a class of the target base station,
wherein determining that the target base station is of a particular class of base stations is based on the received indication.

19. The UE of claim 15, the operations further comprising:
determining one or more of a physical cell identifier (PCI) of the target cell and a secondary synchronization signal (SSS) value of the target cell,
wherein determining that the target base station is of the particular class is based on one or more of the determined PCI of the target cell and the determined SSS value of the target cell.

20. The UE of claim 15, the operations further comprising:
in response to detecting the target cell, reporting a physical cell identifier (PCI) of the target cell to the source base station,
wherein the reporting of the determined network identifier of the target cell to the source base station is in addition to the reporting of the PCI of the target cell to the source base station.

* * * * *